Figure 1:
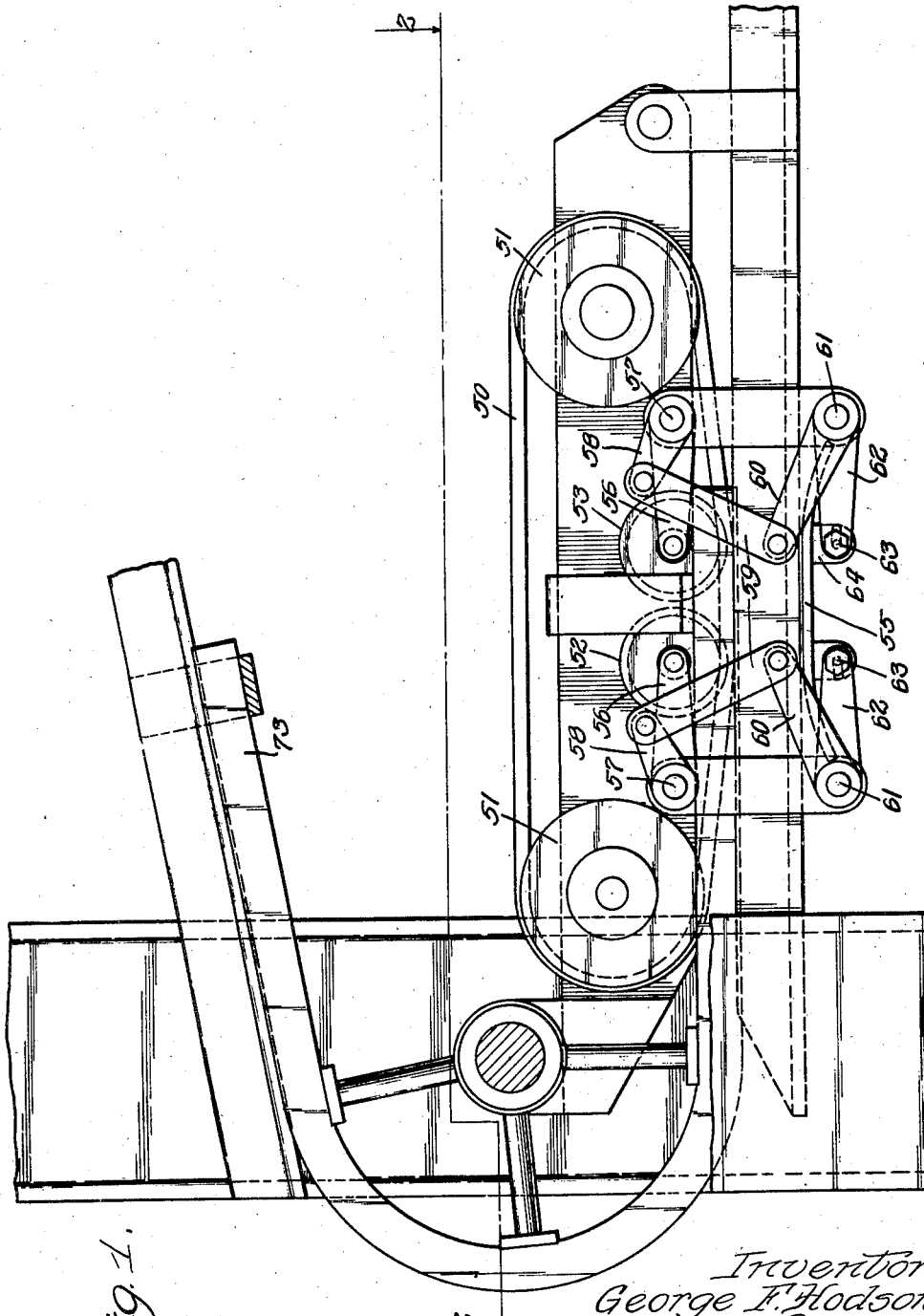

July 16, 1946.　　G. F. HODSON ET AL　　2,403,980
CENTERING DEVICE
Filed Oct. 25, 1944　　5 Sheets-Sheet 1

Inventors
George F. Hodson,
Lyman L. Campbell,
By Smitton, Wiles, Schroeder
Merriam & Hofgren, Attys.

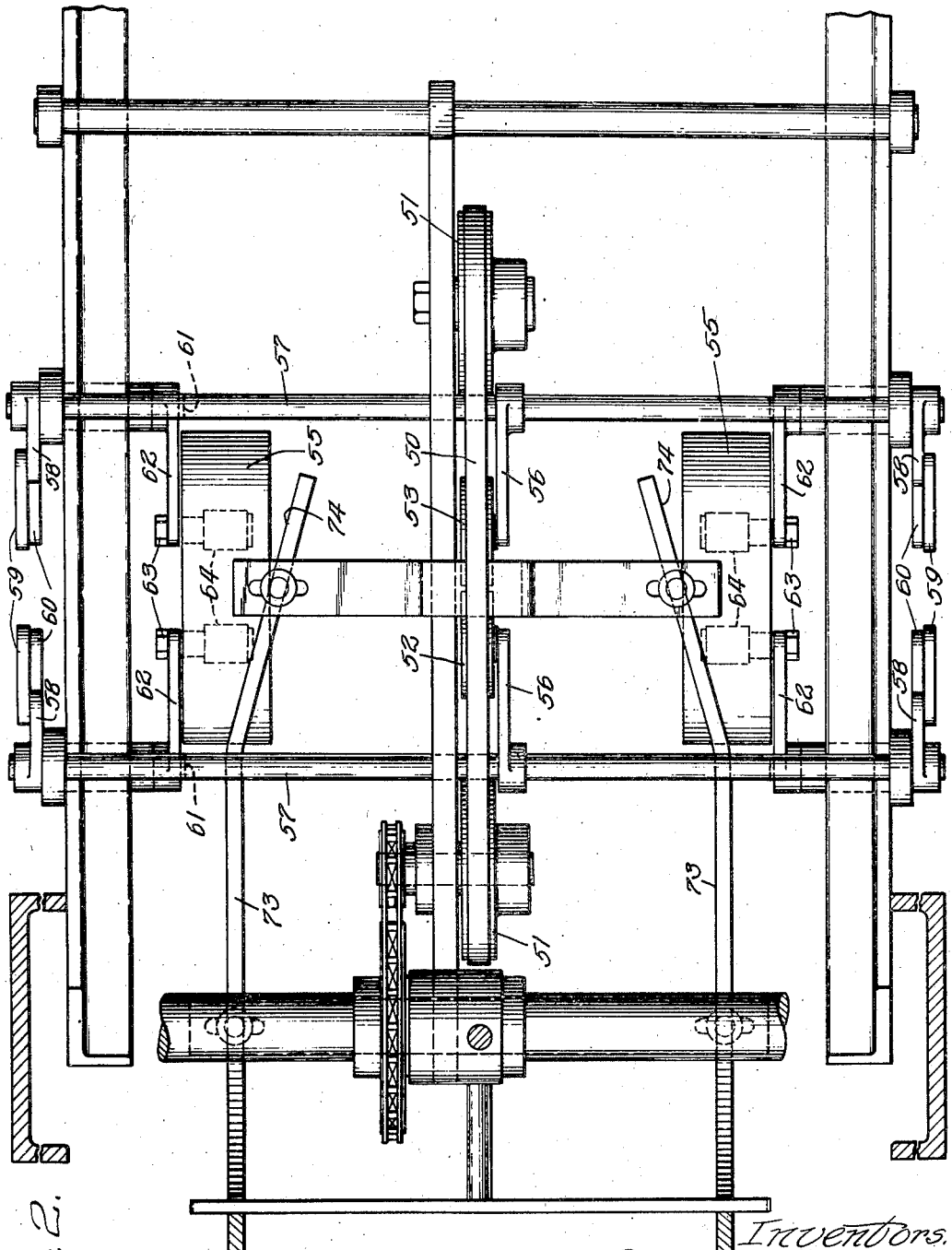

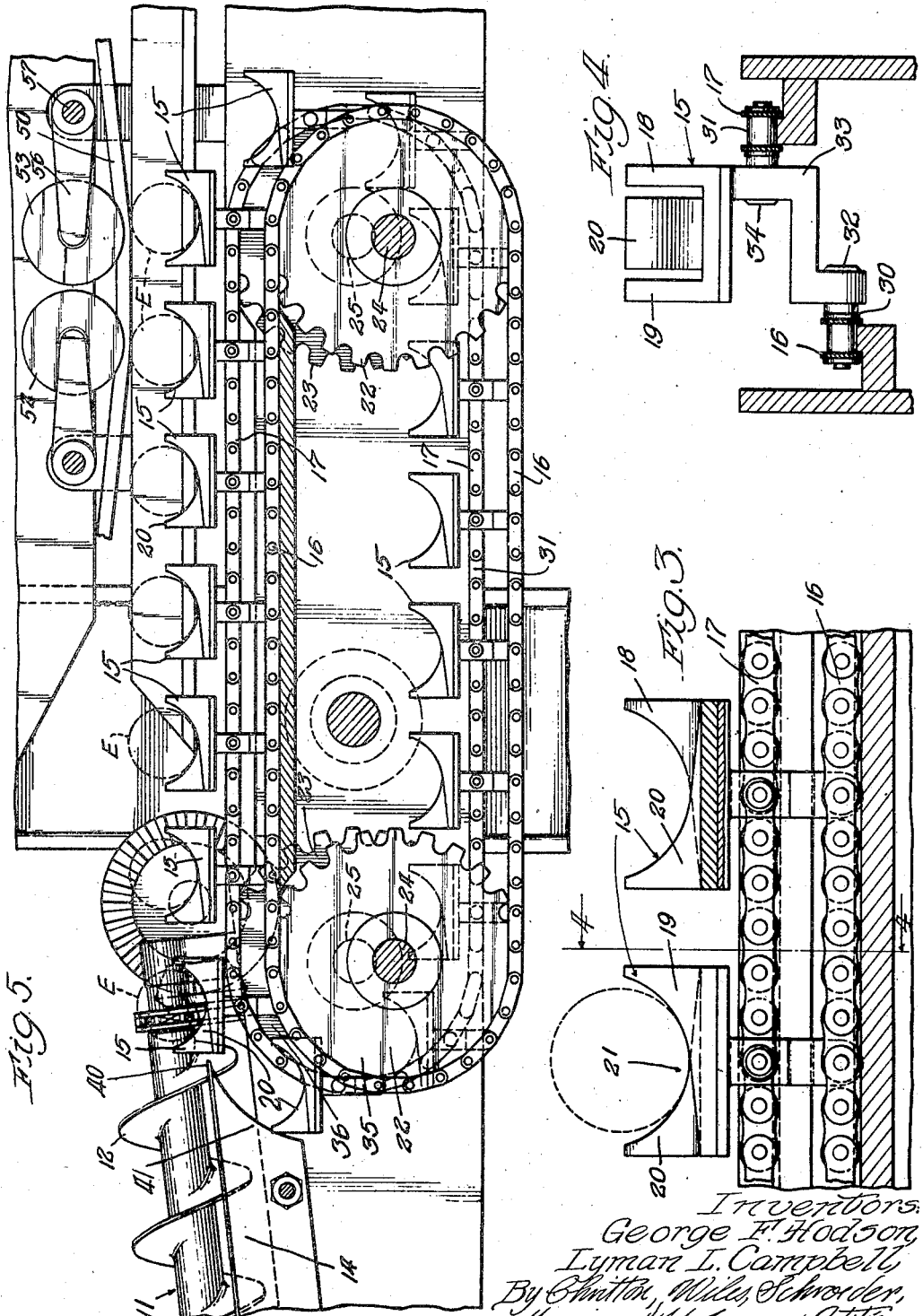

July 16, 1946.　　G. F. HODSON ET AL　　2,403,980
CENTERING DEVICE
Filed Oct. 25, 1944　　5 Sheets-Sheet 4
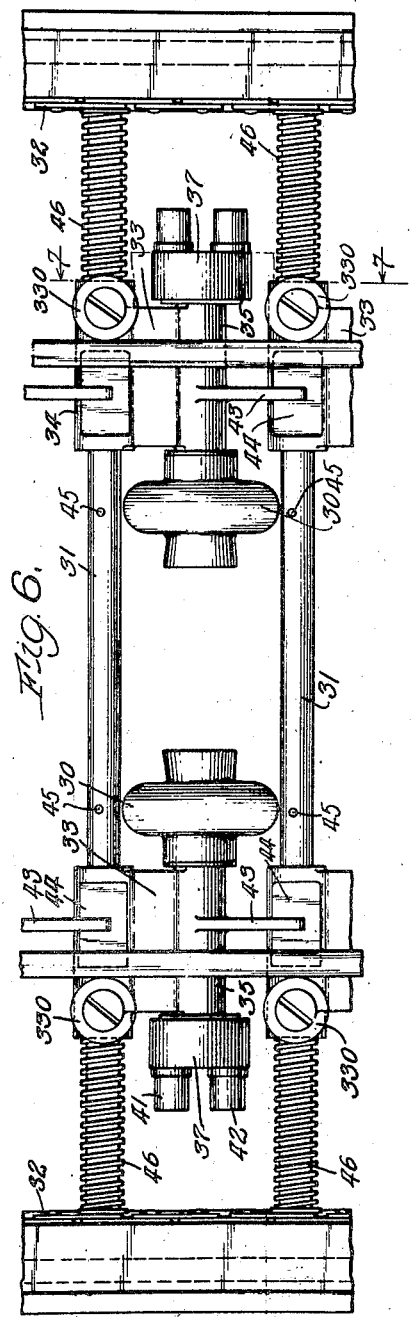
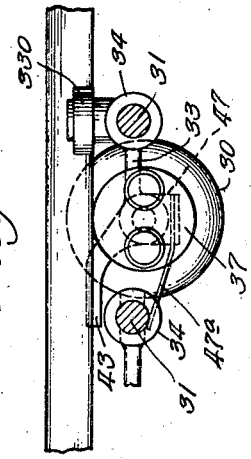
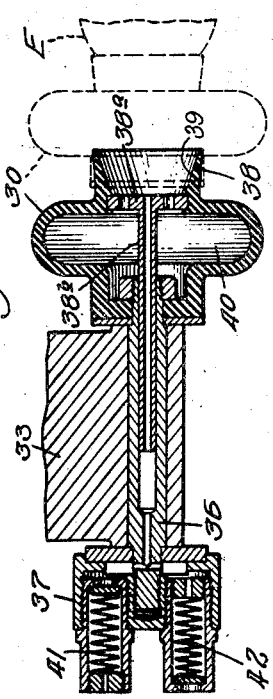
Inventors:
George F. Hodson,
Lyman L. Campbell,
By their Attorneys

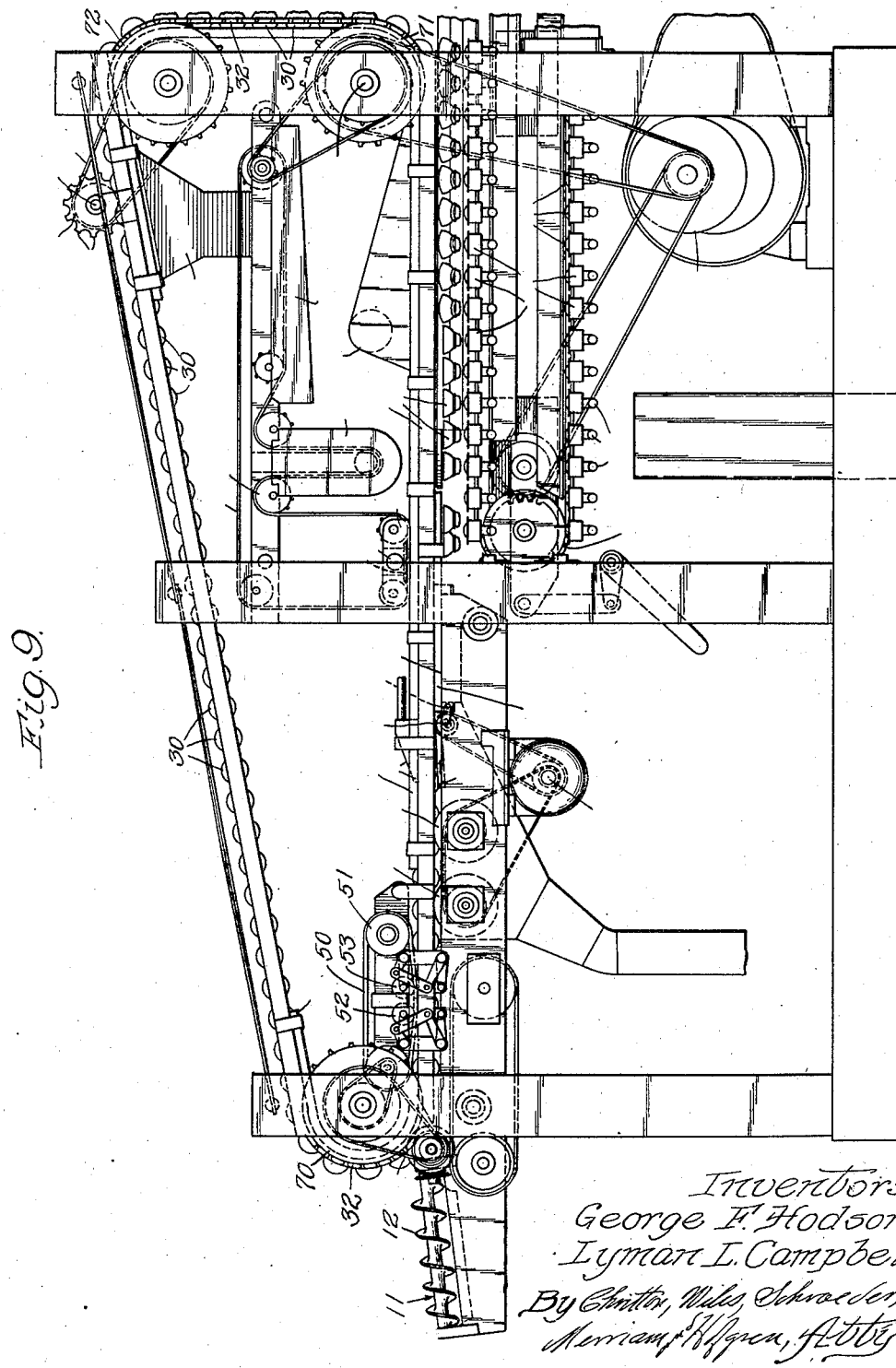

Patented July 16, 1946

2,403,980

UNITED STATES PATENT OFFICE 2,403,980

CENTERING DEVICE

George F. Hodson, Altus, Okla., and Lyman L. Campbell, Riverdale, Ill., assignors to Wilson & Company, Inc., a corporation of Delaware Application October 25, 1944, Serial No. 560,263

11 Claims. (Cl. 198—20)

This invention relates to a centering device and more particularly to an egg centering device constructed to accommodate and precisely center eggs of varying minor diameters.

The invention is designed to be employed in an egg breaking process such as that illustrated in the co-pending application of George F. Hodson, Serial No. 534,552, filed May 8, 1944.

In that process the eggs are advanced in axial alignment with the long axis of the egg transverse to the direction of movement. At the stage of the process at which the centering is applicable, the eggs are carried in saddles having been properly placed therein in any suitable manner, preferably by a screw feed. In the present process the eggs are removed from the saddle by a suitable gripping device, preferably a pair of flexible vacuum cups, one at each end of the egg, and the vertical position of the cups with respect to the saddle is automatically adjusted in accordance with the minor diameter of the egg in the saddle.

The invention is illustrated in the drawings in which Fig. 1 is a side elevation partly in section of the platform; Fig. 2 is a plan view thereof; Fig. 3 is a side elevation partly in section illustrating the manner of carrying the eggs in the saddle; Fig. 4 is a sectional view taken along the line 4—4 in Fig. 3; Fig. 5 is a detailed side elevation partly in section illustrating the saddle carrying mechanism; Fig. 6 is a detailed plan view of preferred egg gripping devices; Fig. 7 is a sectional elevation taken along the line 7—7 in Fig. 6; Fig. 8 is an enlarged sectional view through the vacuum cup mechanism, and Fig. 9 is a side elevational view of part of an egg breaking machine in which an embodiment of the invention is incorporated.

As shown in the drawings, the eggs are introduced into the system by a dual screw feed 11 (only one of which is shown) between which the eggs are advanced. Each screw thread 12 has a variable pitch so that the eggs are accelerated in motion as they advance. The eggs E are aligned with their long axes transverse to the direction of movement and only the ends of the egg are engaged by the screw threads. The eggs are rolled along a pair of guide rails 14, preferably of hard rubber and the path is preferably inclined upwardly so that each egg is positioned positively by contact with the screw threads and at the same time has no tendency to develop momentum. At the top of the screw feed each egg is passed to a saddle 15 which comprises a pair of fingers 18 and 19 and a thumb 20 to form an egg shaped retaining zone 21, as shown in Figure 3. The saddles are spaced at predetermined distances on chains 16 and 17 which are suitably of the bicycle chain type. The saddles are spaced closely enough together so that there is not room for an egg to fall between them. The egg saddle chains 16 and 17 are mounted on sprocket wheels 22 and 23, respectively. It will be noted that chain 17 is mounted to the side of and above chain 16 and the entire saddle is carried between the two chains. Furthermore, the diameter of the wheels 22 and 23 is large enough to permit the saddle to pass upright between the chains and the shafts 24 and 25, respectively. Because of its method of attachment, the egg saddle is always in vertical position, at all points upon the chain orbit. The wheels 22 and 23 are synchronized with the wheels 26 which drive the screws 11 so that a saddle 15 rises into egg receiving position at the end of the rails 14 at the appropriate time to receive an egg. The thumb 20 rises between the rails 14 and lifts the eggs therefrom.

The eggs, properly oriented in their respective saddles, are carried forward and are grasped at each end by a flexible suction cup 30. The cups are carried on platforms 33 pivotally mounted in pairs on shafts 31 mounted between a pair of chains 32, one at each end of the shaft. The platform is enlarged at one side to form a sleeve 34 which fits loosely about the shaft 31, and at the other to form a sleeve 35 which forms a bearing surface for the hollow shaft 36. The shaft 36 carries the suction cup 30 at its inner end and the roller 37 at its outer end.

The suction cup is made of some flexible material such as rubber. It comprises an egg engaging portion 38 having suitably beveled inner walls 39 which terminate in a feather edge. A perforated metal plate 38a carried by the perforated hollow guide rod 38b separates the egg engaging portion from the suction chamber 40. The rod 38b extends into the shaft 36. The suction chamber communicates through the hollow shaft with a check valve 41 carried in one arm of the roller 37, and with a vacuum relief valve 42 in the other arm of the roller 37. The valve 41 serves to vent any pressure which may accumulate in the suction chamber, and the valve 42 may be set to open upon any given vacuum, in order to limit the vacuum which may be created within the suction chamber.

The platform 33 also carries a stop 43 which bears upon the slide area 44 of the next adjacent platform and serves to limit the downward movement of the cup 30. The shaft 31 is provided with a suitable pin 45 for limiting the inward movement of the platform 33. A spring 46 is provided in connection with each platform and normally urges the platform toward the center of the shaft under a suitable pressure which is not sufficient to crush the eggs. Normally this pressure will be in the neighborhood of 4 lbs.

The platforms 33 also carry a depending shoulder portion 47 to which is secured the leaf spring 47a which normally urges the platform 33 in a downward direction. The platform 33 also carries the cam roller 330 which functions to position the platform laterally.

As shown in Fig. 1, a V belt 50 of rubberized material is carried by wheels 51 above the saddle carrying mechanism. The belt 50 is provided with sufficient slack that under the conditions of operation it will contact the upper surfaces of any egg as it passes beneath the central portions of the belt. The belt travels at the same speed as the egg and is held in contact with it by the pulleys 52 and 53 which rest upon the upper side of the V belt. Each pulley is connected by a linkage assembly 54 to a platform 55. This linkage includes the pulley arm 56 secured to shaft 57 carrying the crank arm 58 to which the toggle arm 59 is pivotally secured. The arm 59 is likewise pivotally secured to the crank arm 60 (twice as long as the arm 58) on the shaft 61 also carrying the arm 62 pivotally secured at 63 to the stud 64 of the platform 55. As a result of this linkage, any limited upward movement of the pulleys 53 and 52 results in a corresponding upward movement of the platform 55 approximately half as great.

The roller 37 is in contact with the upper surface of the platform 55 and, as a result, each vacuum cup 30 is individually adjusted vertically in accordance with variations in the position of the platform 55. Inasmuch as these variations correspond to only about half the variations in the diameter of the eggs, they correspond exactly with the changes in radius of the eggs and, therefore, the vacuum cups may be exactly positioned with respect to the long axis of each individual egg as it reaches gripping position, which is at the point intermediate the pulleys 52 and 53.

The ordinary egg may be assumed to have a diameter of 1½ inches and all of the adjustments of the machine may be made upon this basis. However, if other settings are desired, they may be made. The stop 43 on the platforms 33 is so positioned of course that it does not strike the slide area 44 at a position which corresponds to any egg which may pass through the system. In other words, if the smallest egg has a diameter of 1¼ inches, the stop 43 may be positioned to strike only when clearance is less than one inch, giving a safety factor of ¼ inch.

As an example, if 1½ inches has been selected as the normal position, and an egg 1¾ inches in diameter is carried by a saddle into gripping position, the V belt will be elevated ¼ inch which will then raise the platform 55 ⅛ inch and accordingly center the cups accurately with respect to the ends of the egg.

The chains 32 which carry the vacuum cups 30 are driven by wheels 71 and guided by wheels 70 and 72 in a triangular course. The cups are of course synchronized with the saddles. At the appropriate time during the course of travel the cam roller 330 engages the cam surfaces 73 and and as a result is forced back against the springs 46. As the platforms 33 bearing the cups 30 move in synchronization with an egg in a saddle, they are gradually released by the cam surface 74 (shown in Fig. 2) and permitted to come into engagement with the egg under the pressure of the spring. At the same time the egg is held against rotation by the V belt 50 (as shown in Fig. 1) whereas the rollers 37 connected with the vacuum cups 30 are rotated by contact with the platform 55. In this way the position of the egg rotates with respect to the flexible grasping portion of the vacuum cup and is firmly seated therein by this motion.

The egg is now firmly held in a pair of vacuum cups and is from this point on carried by them, each individual saddle being carried downwardly by the chains 16 and 17 shortly after the vacuum cups have grasped the egg.

The foregoing detailed description has been given for clearness of understanding only, and no unnecessary limitations should be understood therefrom.

What we claim as new and desire to secure by Letters Patent is:

1. An egg centering device comprising an egg carriage, a pair of egg grippers, means for advancing an egg on the carriage, means for advancing the grippers synchronously therewith with the center of each gripper in a plane passing through the long axis of the egg, a centering member normally urged to contact the equator of an egg in said carriage and freely movable in a vertical direction, and means operatively connected with said centering member for adjusting the relative positions in a vertical plane of the grippers and the carriage by approximately one-half the variation in position of the centering member.

2. A device as set forth in claim 1, in which the centering member includes an endless belt and means for moving the belt synchronously with the movement of the carriage.

3. An egg centering device comprising an egg carriage, a pair of egg grippers disposed on opposite sides of the carriage, means for advancing an egg on the carriage with its major axis transverse to the direction of movement, centering means normally contacting the equator of an egg in said carriage, and means operatively connected with said centering means for adjusting the relative positions of the grippers in a vertical plane by approximately one-half the variation in position of the centering member.

4. A device as set forth in claim 3, in which means are provided for advancing the grippers synchronously with the movement of the carriage, with the center of each gripper in a plane passing through the long axis of the egg.

5. A device as set forth in claim 3, in which means are provided for advancing the grippers synchronously with the movement of the carriage, with the center of each gripper in a plane passing through the long axis of the egg, and in which the centering member includes an endless belt and means for moving the belt synchronously with the movement of the carriage.

6. An egg centering device comprising an egg carriage, a pair of egg grippers, means for advancing an egg on the carriage, means for advancing the grippers synchronously therewith with the center of each gripper in a plane passing through the long axis of the egg, a centering member normally urged to contact the equator of an egg in said carriage and freely movable in a vertical direction, and means including a linkage of levers operatively connected with said centering member for adjusting the relative positions in a vertical plane of the grippers and the carriage by approximately one-half the variation in position of the centering member.

7. An egg centering device comprising an egg carriage, a pair of egg grippers, means for advancing an egg on the carriage, means for advancing the grippers synchronously therewith with the center of each gripper in a plane passing through the long axis of the egg, a centering member normally urged to contact the equator of an egg in said carriage and freely movable in a vertical direction, and means including a linkage of levers and platforms against which the respective grippers are normally urged operatively connected with said centering member for adjusting the relative positions in a vertical plane of the grippers and the carriage by approximately one-half the variation in position of the centering member.

8. An egg centering device comprising an egg carriage, means for advancing an egg on the carriage in a direction transverse to the major axis of the egg, a pair of vacuum cup grippers disposed adjacent each end of the egg, means for advancing the grippers synchronously with the movement of the egg, a platform disposed at a predetermined level against which each gripper is normally urged in rolling contact, an endless belt centrally disposed above the egg, means for advancing the belt synchronously with the movement of the egg, said belt having sufficient slack to permit a predetermined vertical displacement thereof by eggs of varying diameters, and means carried by the belt for adjusting the height of the gripper carrying platforms by approximately one-half the variation in the height of the belt.

9. A device as set forth in claim 1, in which a plurality of egg carriages and a plurality of grippers are mounted in spaced relationship upon endless chains.

10. A device as set forth in claim 3, in which a plurality of egg carriages and a plurality of grippers are mounted in spaced relationship upon endless chains.

11. A device as set forth in claim 8, in which a plurality of egg carriages and a plurality of grippers are mounted in spaced relationship upon endless chains.

GEORGE F. HODSON.
LYMAN L. CAMPBELL.